No. 650,839. Patented June 5, 1900.
H. E. HEATH.
STEERING MECHANISM FOR AUTOMOBILES.
(Application filed Jan. 17, 1900.)
(No Model.) 2 Sheets—Sheet 1.

Witnesses:

Inventor:
Harry E. Heath
Harry P. Williams
Atty.

THE NORRIS PETERS CO., PHOTO-LITHO., WASHINGTON, D. C.

No. 650,839. Patented June 5, 1900.
H. E. HEATH.
STEERING MECHANISM FOR AUTOMOBILES.
(Application filed Jan. 17, 1900.)
(No Model.) 2 Sheets—Sheet 2.

Witnesses: Inventor:

United States Patent Office.

HARRY E. HEATH, OF WINDSOR, CONNECTICUT, ASSIGNOR TO THE EDDY ELECTRIC MANUFACTURING COMPANY, OF SAME PLACE.

STEERING MECHANISM FOR AUTOMOBILES.

SPECIFICATION forming part of Letters Patent No. 650,839, dated June 5, 1900.

Application filed January 17, 1900. Serial No. 1,796. (No model.)

*To all whom it may concern:*

Be it known that I, HARRY E. HEATH, a citizen of the United States, residing at Windsor, in the county of Hartford and State of Connecticut, have invented certain new and useful Improvements in Steering Mechanisms for Automobiles, of which the following is a specification.

This invention relates to a steering mechanism in which a cam is employed for turning the spindles and steering-wheels and directing the vehicle in the desired path.

The object of the invention is the production of a steering mechanism which is simple, sensitive, and durable and that is so arranged that at all times the wheels are locked against self-turning, thus relieving the hand of the steerer from the jar and strains incident to the unevennesses of the road, which tend to turn the wheels from the course.

Each of the embodiments of the invention illustrated by the accompanying drawings is provided with a cam or cam-like part that is connected with and is turned by the movements of the steering-handle and that is engaged with a lever that is connected with the spindles to which the steering-wheels are attached, so that when the handle is moved the cam imparts an oscillatory movement to the spindles of the wheels.

Figure 1:
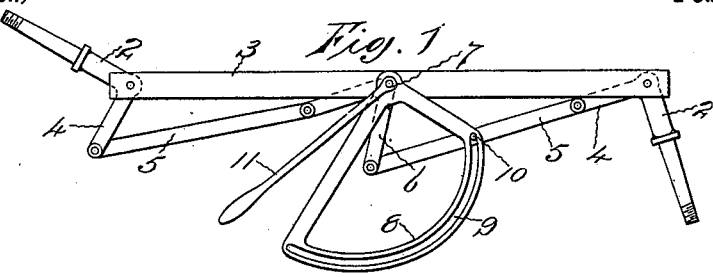
Figure 2:
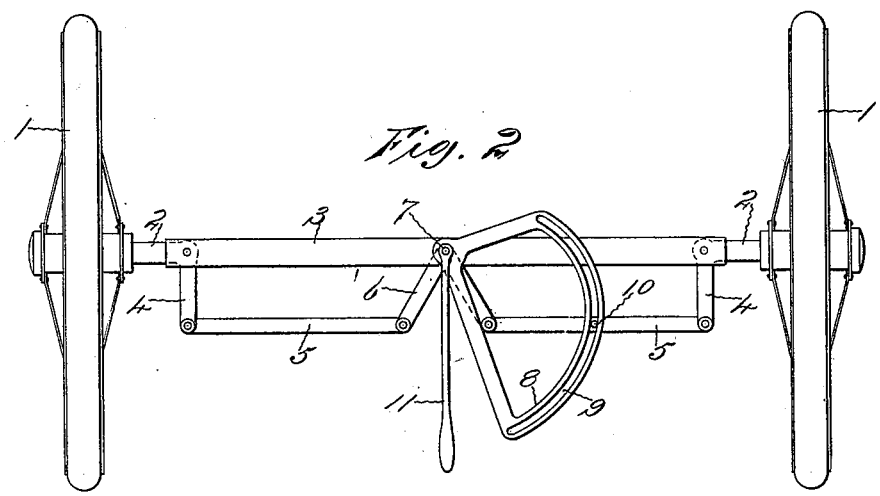
Figure 3:
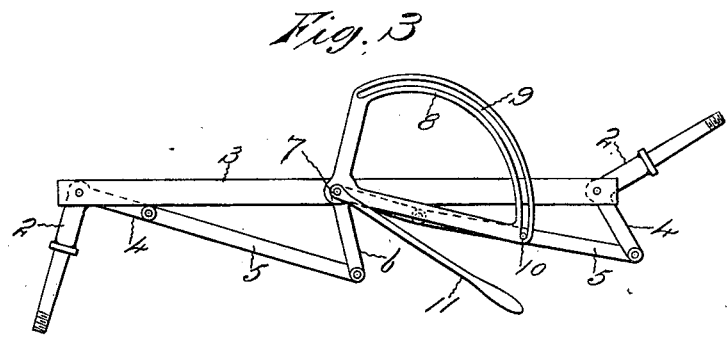
Figure 4:
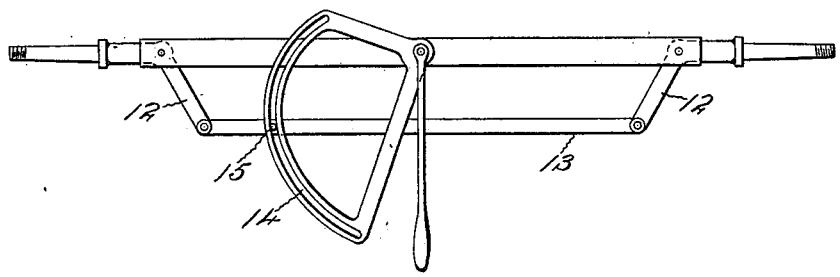
Figure 5:
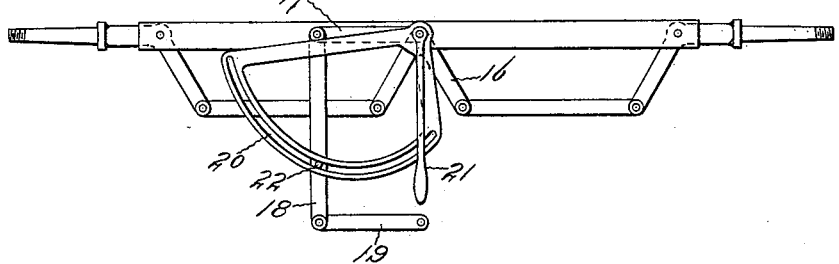
Figure 6:
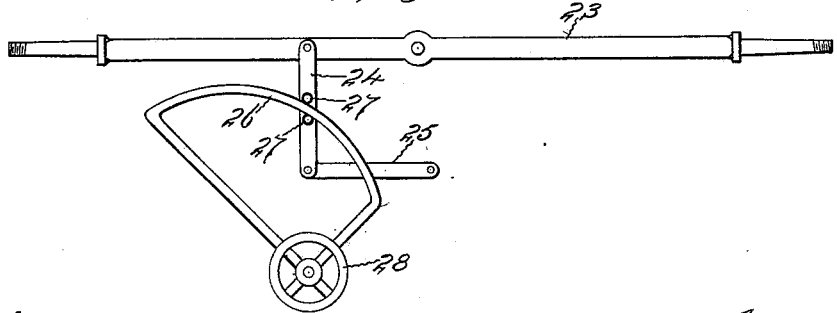

Figure 1 of the views shows a plan of a steering-axle and the wheel-spindles of an automobile arranged with a form of the improved steering mechanism turned in one direction. Fig. 2 shows a plan of the same axle and steering mechanism with the wheels standing straight. Fig. 3 shows the same form of steering mechanism with the parts turned in the opposite direction to that illustrated in Fig. 1. Fig. 4 shows a plan of another form of the steering mechanism. Fig. 5 shows a plan of another development, and Fig. 6 shows still another development.

The wheels 1, of any ordinary design, are fastened in a common manner to the spindles of the bent levers 2, that are pivoted to the axle-bar 3. In the form first shown the arms 4 of the bent levers project rearwardly substantially at right angles with the wheel-spindles, and their ends are connected by links 5 with the ends of a fork 6, that at its apex 7 is pivoted to the axle-bar. The cam 8, pivotally supported in any suitable manner, has a slot 9, into which extends a pin 10, that projects from one of the links 5. The steering-handle lever 11, which is located within convenient reach of the vehicle-driver, is attached to the cam in such manner that the turning of the handle turns the cam. When the handle and cam are turned, the walls of the cam-slot act on the pin and impart movement to the links and fork. The movements of the links cause an oscillatory movement of the angle-levers and turn the wheels for steering the vehicle in the desired direction. In Fig. 2 the handle is represented as straight, in Fig. 1 the handle is shown as turned to one side, while in Fig. 3 the handle is turned to the opposite side. The engagement of the pin projecting from the link with the walls of the cam-slot is in such line that the links cannot move unless the cam moves, and consequently the accidental turning of the wheel-spindles and wheels is precluded. By this means the wheels are locked from self-movement incident to ruts or other unevenness of the road, which offer more resistance to one wheel than the other, and after the vehicle has been turned in the desired direction the hand of the driver may be entirely removed from the handle without danger of having the vehicle turned aside from its course.

In the second form of the invention illustrated the rear end 12 of each of the bent levers extends at an obtuse angle with its wheel-spindle and the ends of the levers are joined by a bar 13. The cam-slot 14 in this instance is arranged to receive the pin 15, and when the handle is moved the cam by its slot and the pin moves the bar and oscillates the levers for turning the wheels. In this instance the lever-connecting bar is easily reciprocated by the cam, and yet the bar is locked against accidental reciprocation, so that the wheels cannot turn when not desired.

In the form shown in Fig. 5 the rearwardly-extending arms of the bent levers are connected by links with the ends of a fork 16, substantially as shown in the first-described form of the invention. In this instance a rocker-arm 17 is suitably secured to the fork and this rocker-arm is joined by a link 18 with the end of a lever 19. The cam 20, to which the handle 21 is secured, as in the other forms, is arranged to engage a pin 22, projecting from the link 18. The provision of the rocker-arm, the link, and the lever with this form of the invention enables the cam to be located back of the axle-bar. The cam in this form easily moves the link and rocker-arm, so as to cause the fork, links, and bent levers to turn the wheels; but the engagement of the pin that projects from the link with the cam is such that the link, and consequently the wheels, cannot move accidentally.

In the form of the invention illustrated in Fig. 6 the axle-bar 23 is pivoted at the center, as in the common form of fifth-wheel running-gears. A link 24 joins this axle-bar one side of the pivot with a lever 25, suitably connected with a fixed part of the running-gear. The cam 26 engages the pins 27, projecting from the link 24, in such manner that when the cam is turned by means of the hand-wheel 28 the axle-bar will be given an oscillatory movement on its pivot, so as to cause the wheels to turn. The axle-bar and the wheels with this form will not turn accidentally, for the cam can be placed in such relation to the pins that it cannot be moved by the pressure of the pins.

The cams of course may be arranged in different positions, and they may be so shaped that the wheels will be turned more at one time than another—that is, may be moved either quickly or slowly when they start to turn, or may be moved either quickly or slowly after considerable turn has been made. In all cases, however, the cams are so arranged that they have a powerful action on the connecting-links, and yet they prevent any accidental movement of the connecting-links, and thus hold the wheels from turning of their own volition. The cams can be formed in any desired manner, and they may be connected with handles of any suitable design.

I claim as my invention—

1. In combination in an automobile steering mechanism, axle-spindles for the steering-wheels, means connecting the spindles, a cam engaged with the spindle-connecting means and adapted when turned to move the connecting means and when stationary to lock the connecting means against movement, and a handle for moving the cam, substantially as specified.

2. In combination in an automobile steering mechanism, levers connected with the wheels, links connecting the wheel-levers, a cam engaging the links and adapted to move the links but not be moved by the links, and a handle for moving the cam, substantially as specified.

3. In combination in an automobile steering mechanism, bent levers connected with the steering means, a fork pivotally connected with the axle-bar, links connecting the bent levers with the fork, a cam arranged to engage one of the links, and a handle for moving the cam, substantially as specified.

HARRY E. HEATH.

Witnesses:
H. R. WILLIAMS,
F. G. HOLCOMBE.